United States Patent [19]

Krufka

[11] Patent Number: 4,464,556
[45] Date of Patent: Aug. 7, 1984

[54] SYSTEM AND METHOD OF ACCURATELY CONTROLLING THE ELECTRODE VOLTAGE OF A WELDING DEVICE

[75] Inventor: Frank S. Krufka, Mount Joy, Pa.
[73] Assignee: RCA Corporation, New York, N.Y.
[21] Appl. No.: 508,261
[22] Filed: Jun. 27, 1983
[51] Int. Cl.³ ............................................. B23K 11/26
[52] U.S. Cl. ................................. 219/113; 219/110; 219/117.1
[58] Field of Search ...................... 219/113, 117.1, 110

[56] References Cited

U.S. PATENT DOCUMENTS

| | | | |
|---|---|---|---|
| 3,352,994 | 11/1967 | Merchant | 219/93 |
| 3,604,886 | 9/1971 | Merchant | 219/18 |
| 4,182,949 | 1/1980 | Powers et al. | 219/113 |
| 4,228,340 | 10/1980 | Dufrenne | 219/113 |

FOREIGN PATENT DOCUMENTS 55-100875 8/1980 Japan ................................. 219/113

*Primary Examiner*—C. C. Shaw
*Attorney, Agent, or Firm*—Eugene M. Whitacre; Dennis H. Irlbeck; Lester L. Hallacher

[57] ABSTRACT

The voltage supplied to the welding electrode of a welding system repeatedly and accurately charges an energy storage device by directly sensing the charging voltage across the storage device and comparing the sensed voltage to a reference voltage to produce a control signal and by using the control signal to control the welding system. The charge storage device is charged through the part to be welded to warm the part and improve the weld.

6 Claims, 1 Drawing Figure

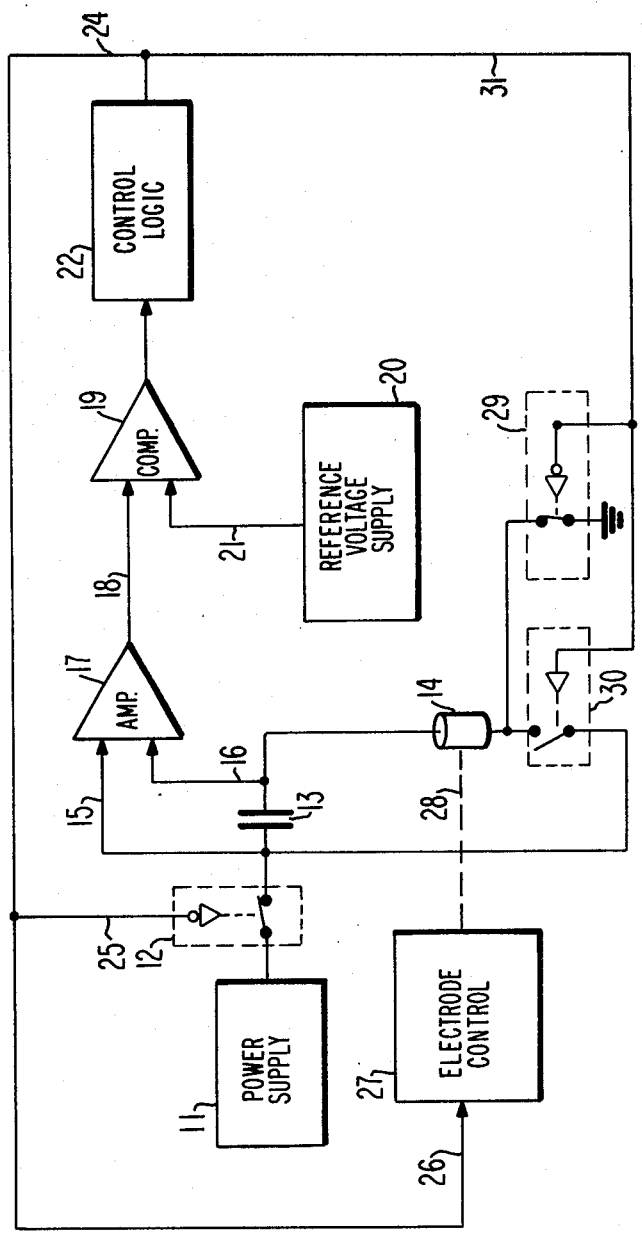

SYSTEM AND METHOD OF ACCURATELY CONTROLLING THE ELECTRODE VOLTAGE OF A WELDING DEVICE

BACKGROUND OF THE INVENTION

This invention relates generally to the welding of thin metal parts and particularly to the spot welding of the metal parts of an electron gun assembly for color picture tubes.

In the spot welding of thin metal parts, a welding electrode is brought into contact with one side of the parts to be welded and a ground electrode is brought into contact with the opposite side of the parts. A voltage is placed on the welding electrode and discharged from the welding electrode, through the parts and to the ground electrode. The current passing through the metal melts a small area of the metal where the welding electrode contacts the part. When the molten metal cools, the parts are blended, or welded together. Typically, the voltage needed on the welding electrode is provided by charging a capacitor which stores the voltage until the discharge through the parts to be welded is effected. Typically, the capacitor is charged using a fixed voltage source and a timing means. Accordingly, the capacitor is charged for a fixed period of time without regard to the actual voltage to which it is charged. Variations in contact resistance or other parameters in the charging system frequently cause the voltage to which the capacitor is charged to vary because the parameter variations result in changes in the r-c time constant of the charging network. The charging voltage variations result in inconsistency in the welding of the thin metal parts because the welding current is directly dependent upon the charge on the storage device. There, therefore, is a need for a system for repeatedly and accurately charging the storage device to a particular voltage to improve the consistency in the welding of thin metal parts.

The instant invention fulfills this need by the provision of a system and method for accurately controlling the electrode voltage of a welding device independently of time and of resistance variations of the welding or charging systems.

SUMMARY

A system for controlling the voltage to the welding electrode of a welding device includes a charge storage means electrically coupled to the welding electrode. A voltage is applied to the charge storage means and the storage voltage is sensed to provide a sensed signal representative of the stored voltage. A reference voltage and the sensed signal are compared to provide a control signal when the sensed signal substantially equals the reference voltage. A control means is responsive to the control signal to discharge the charge storage means through the welding electrode and to inhibit charging the storage means during the discharge.

BRIEF DESCRIPTION OF THE DRAWINGS

The FIGURE is a preferred embodiment of the instant invention.

DETAILED DESCRIPTION AND OPERATION

In the FIGURE, the output of a power supply 11 of known type is connected to one side of a charge storage means, in the form of a capacitor 13, through a normally closed solid state switch 12. The other side of the capacitor 13 is coupled to a welding electrode 14. The power supply 11 charges the capacitor 13 to a predetermined voltage. The welding electrode 14 is brought into contact with one side of the parts to be welded (not shown) and a ground electrode (not shown) is brought into contact with the other side of the parts to be welded.

The capacitor 13 is charged through the welding electrode 14, the parts to be welded and a normally closed solid state switch 29. The charging of the capacitor 13 through the parts to be welded heats the parts and improves the welds. The capacitor 13 is discharged through the welding electrode 14, the parts to be welded, the ground electrode and a normally open solid state switch 30 to melt the small area where the welding electrode contacts the parts to be welded. The moltant metal cools to bond the parts together with a permanent weld.

Typically, in the prior art, the charge storage device 13 is charged by applying a fixed voltage for a predetermined period of time. However, the resistance of the welding electrode 14, the grounding electrode, the contacts which turn the circuit on and off or other resistance elements in the charging circuit can change with use or time. Such changes cause the voltage to which the storage device is charged to vary because the r-c time constant of the system changes when the resistance changes. The storage device, therefore, is not charged to the desired voltage. Both increases and decreases in the charging voltage are undesirable. Decreases lower the welding current, the metal does not blend properly and the welds are weak. Increases overheat the parts and the molten metal is either blown away or a larger diameter weld is made. The instant invention overcomes these disadvantages by repeatedly and accurately charging the capacitor 13 to the desired voltage irrespective of the time constant of the system.

Two leads 15 and 16 are arranged on opposite sides of the capacitor 13 to sense the charging voltage directly across the capacitor. The leads 15 and 16 are coupled to the input terminals of a sensing means in the form of an isolation amplifier 17. The output of the amplifier 17 available on an output line 18 thus is a sensed signal which is directly representative of the voltage to which the capacitor 13 is charged. The sensed signal on the line 18 serves as an input signal to a comparator 19. A reference voltage supply 20 provides another input to the comparator 19 by way of a line 21. The reference voltage supply 20 is set to the voltage to which the charging capacitor 13 is to be charged. As the voltage on the capacitor 13 increases, the sensed signal on line 18, which is representative of the stored voltage, also increases. When the sensed signal substantially equals the reference voltage available on line 21, the comparator 19 changes state to actuate control logic 22 by way of the line 23. The output of the control logic is coupled by a lines 24 and 25 to the solid state switch 12 and to an electrode control 27 by way of a line 26. The electrode control 27 is mechanically and electrically coupled to the welding electrode 14, as indicated by the dashed line 28. The control logic 22 contains a series of one-shot multivibrators to establish the desired timing and is within the purview of one skilled in the art. When the control signal is received from the comparator 19, the control logic performs several functions. The output on line 24 is coupled by line 25 to the normally closed solid state switch 12 and the switch opens to inhibit further charging of the capacitor 13. The output of the control logic 22 also is coupled by a line 31 to the solid state switches 29 and 30. The normally closed switch 29 opens to disconnect the ground electrode from ground. After the switches 12 and 29 are opened, the normally open switch 30 closes and the capacitor 13 is discharged through the welding electrode 14, the parts to be welded and the ground electrode to effect the welding. When the capacitor 13 discharges, the comparator 19 returns to the charging state and the control signal is no longer available to the control logic 22. The switches 12, 29 and 30 return to their normal states to again permit the charging of the capacitor 13.

The output of the control logic 22 also is coupled to the electrode control 27. The welding electrode 14 is preferably in contact with the parts to be welded during the charging to warm the parts for improved welding. After the welding is completed, the electrode 14 is moved away from the welded parts to permit removal of the parts and insertion of new parts to be welded. The welding electrode 14 is brought into contact with the new parts to be welded and the storage device 13 is recharged to the voltage established by the reference voltage from the reference voltage of the supply 20.

Thus, in utilizing the invention, the capacitor 13 is charged to the same voltage irrespective of parameter changes of the elements within the system. System parameter changes result in variations in the charging time of the capacitor but such changes have no detrimental effect on the quality of the welds because the capacitor is always charged to the reference voltage and this voltage determines the quality of the welds. Additionally, the reference voltage supply 20 preferably is variable. Accordingly, the voltage to which the charge storage 13 is charged can be selected in accordance with the thicknesses of the parts to be welded and optimum welding can be effected for a wide range of thicknesses.

What is claimed is:

1. A system for controlling the voltage to the welding electrode of a welding device and to the part to be welded comprising charge storage means electrically coupled to said electrode;
means for applying a voltage to said charge storage means through said electrode and said part to be welded;
sensing means for sensing the voltage directly across said charge storage means and providing a sensed signal representative of said voltage;
means for providing a reference voltage;
means responsive to said sensed signal and said reference voltage for providing a control signal when said sensed signal substantially equals said reference voltage; and
control means responsive to said control signal for discharging said charge storage means through said electrode and for inhibiting charging of said storage means during said discharging.

2. The system of claim 1 wherein said charge storage means is a capacitor.

3. The system of claim 2 wherein said sensing means is a multi-input terminal device having an input terminal coupled to each side of said capacitor.

4. The system of claim 3 wherein said sensing means is an isolation amplifier.

5. The system of claim 4 wherein said means responsive to said sensed signal and said reference voltage is a comparator.

6. A method of controlling the electrode voltage to the welding electrode of a welding device comprising the steps of voltage charging a charge storage device through the welding electrode and the part to be welded;
sensing the voltage directly across said charge storage device and producing a sensed signal representative of said charge;
comparing said sensed signal and a reference signal to provide a control signal when said sensed signal substantially equals said reference signal; and
utilizing said control signal to discharge said charge storage means through a welding electrode and to inhibit recharging of said charge storage means during said discharge.

* * * * *